(12) United States Patent
John

(10) Patent No.: US 8,517,662 B2
(45) Date of Patent: Aug. 27, 2013

(54) ATMOSPHERIC ENERGY EXTRACTION DEVICES AND METHODS

(75) Inventor: Hanback John, Flint Hills, VA (US)

(73) Assignee: Solar Wind Energy Tower, Inc., Annapolis, MD (US)

(*) Notice: Subject to any disclaimer, the term of this patent is extended or adjusted under 35 U.S.C. 154(b) by 241 days.

(21) Appl. No.: 13/098,476

(22) Filed: May 1, 2011

(65) Prior Publication Data
US 2012/0274068 A1    Nov. 1, 2012

(51) Int. Cl.
*F03D 9/00* (2006.01)

(52) U.S. Cl.
USPC .................. 415/1; 415/4.1; 415/909

(58) Field of Classification Search
USPC .............. 290/44, 55; 415/1, 2.1, 4.1, 17, 415/118, 126, 143, 151, 909
See application file for complete search history.

(56) References Cited

U.S. PATENT DOCUMENTS

| | | | |
|---|---|---|---|
| 3,894,393 A | 7/1975 | Carlson | |
| 4,452,046 A * | 6/1984 | Valentin | 60/641.11 |
| 4,801,811 A | 1/1989 | Assaf | |
| 5,483,798 A | 1/1996 | Prueitt | |
| 6,510,687 B1 | 1/2003 | Zaslavsky et al. | |
| 6,647,717 B2 | 11/2003 | Zaslavsky et al. | |
| 8,232,665 B2 * | 7/2012 | Sato | 290/55 |
| 2009/0260301 A1 * | 10/2009 | Prueitt | 52/2.26 |
| 2011/0316279 A1 * | 12/2011 | Bahari et al. | 290/44 |
| 2012/0261918 A1 * | 10/2012 | Hanback | 290/44 |

FOREIGN PATENT DOCUMENTS
EP    2096304 A1    9/2009

* cited by examiner

*Primary Examiner* — Edward Look
*Assistant Examiner* — Liam McDowell
(74) *Attorney, Agent, or Firm* — Laubscher & Laubscher, P.C.

(57) ABSTRACT

An apparatus for producing electricity includes a tower capable of adding moisture at the top of the tower to hot-dry air so as to generate a downdraft of wind within the interior of the tower, vanes coupled to the exterior of the tower that at least partially define a plurality of elongated pockets at the exterior of the tower, flaps located within the pockets configured to redirect incident wind downwards, and at least a first wind tunnel configured to receive the redirected incident wind so as to convert such wind to electricity.

20 Claims, 10 Drawing Sheets

```
                    START
                      │
                      ▼
        ┌─────────────────────────────┐
   ┌───▶│   MEASURE CAPTURED WIND     │──── 910
   │    └─────────────────────────────┘
   │                  │
   │                  ▼
   │    ┌─────────────────────────────┐
   │    │    ADJUST EXTERNAL SPRAY    │──── 912
   │    └─────────────────────────────┘
   │                  │
   │                  ▼
   │    ┌─────────────────────────────┐
   │    │ MEASURE/CALCULATE AVAILABLE │──── 914
   │    │    CAPTURED WIND ENERGY     │
   │    └─────────────────────────────┘
   │                  │
   │                  ▼
   │    ┌─────────────────────────────┐
   │    │ MEASURE ATMOSPHERIC         │──── 920
   │    │       CONDITIONS            │
   │    └─────────────────────────────┘
   │                  │
   │                  ▼
   │    ┌─────────────────────────────┐
   │    │    ADJUST INTERNAL SPRAY    │──── 922
   │    └─────────────────────────────┘
   │                  │
   │                  ▼
   │    ┌─────────────────────────────┐
   │    │ MEASURE/CALCULATE AVAILABLE │──── 924
   │    │    GENERATED WIND ENERGY    │
   │    └─────────────────────────────┘
   │                  │
   │                  ▼
   │    ┌─────────────────────────────┐
   │    │      CONFIGURE SHUNTS       │──── 930
   │    └─────────────────────────────┘
   │                  │
   └──────────────────┘
```

FIG. 9

ATMOSPHERIC ENERGY EXTRACTION DEVICES AND METHODS

BACKGROUND

1. Field

This disclosure relates to methods and system for extracting energy from hot atmospheric air and/or wind.

2. Background

The idea of creating electrical energy from environmental forces, such as wind, ocean currents and tides, and hot/dry air is not new. Unfortunately, such environmental forces tend to be unreliable in intensity or cyclical in their nature. For example, windmills are often subjected to wind speeds varying by orders of magnitude in a given day. While the fundamental notions of converting mechanical energy from the environment are sound, efficiently capturing such mechanical energy and converting it to electrical energy poses many practical problems that often have not been addressed.

BRIEF DESCRIPTION OF THE DRAWINGS

The features and nature of the present disclosure will become more apparent from the detailed description set forth below when taken in conjunction with the accompanying drawings in which reference characters identify corresponding items.

FIG. 9 is a flowchart outlining an exemplary operation for efficiently converting mechanically captured energy into electricity.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

Figure 1:
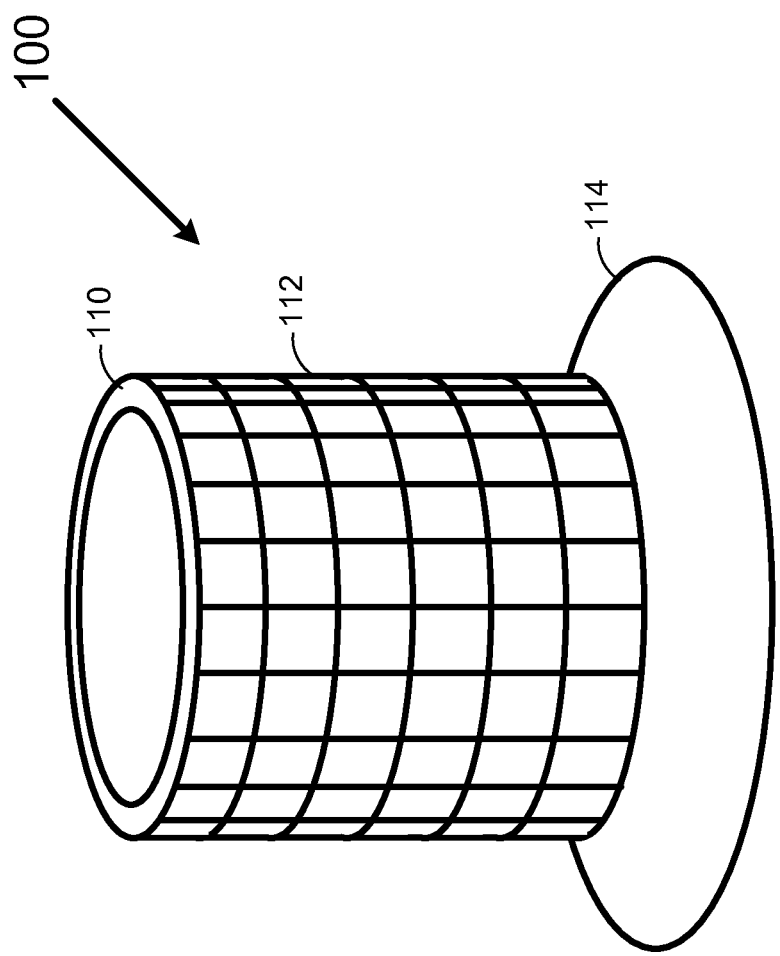
FIG. 1 is a novel energy tower capable of extracting energy from the atmosphere using multiple techniques.

FIG. 1 is a novel energy tower 100 capable of extracting energy from the atmosphere using multiple techniques by generating downward winds—and thus wind energy—using hot-dry air. As the basic concepts of such towers are known in the relevant arts, no further detail will be provided as to the basic theory of operation of previously conceived devices that may apply to the present device. As shows in FIG. 1, the energy tower 100 includes an upper lip 110, a hollow/vertical member 112 and a base 114. The base 114 houses an array of wind-tunnels and turbines as will be shown below. The lip, 110, vertical member 112 and base 114 cooperate to cause moisture-laden air to accelerate internal to the vertical member 112 into the individual wind tunnels (not shown) located in the base 114.

Figure 2:
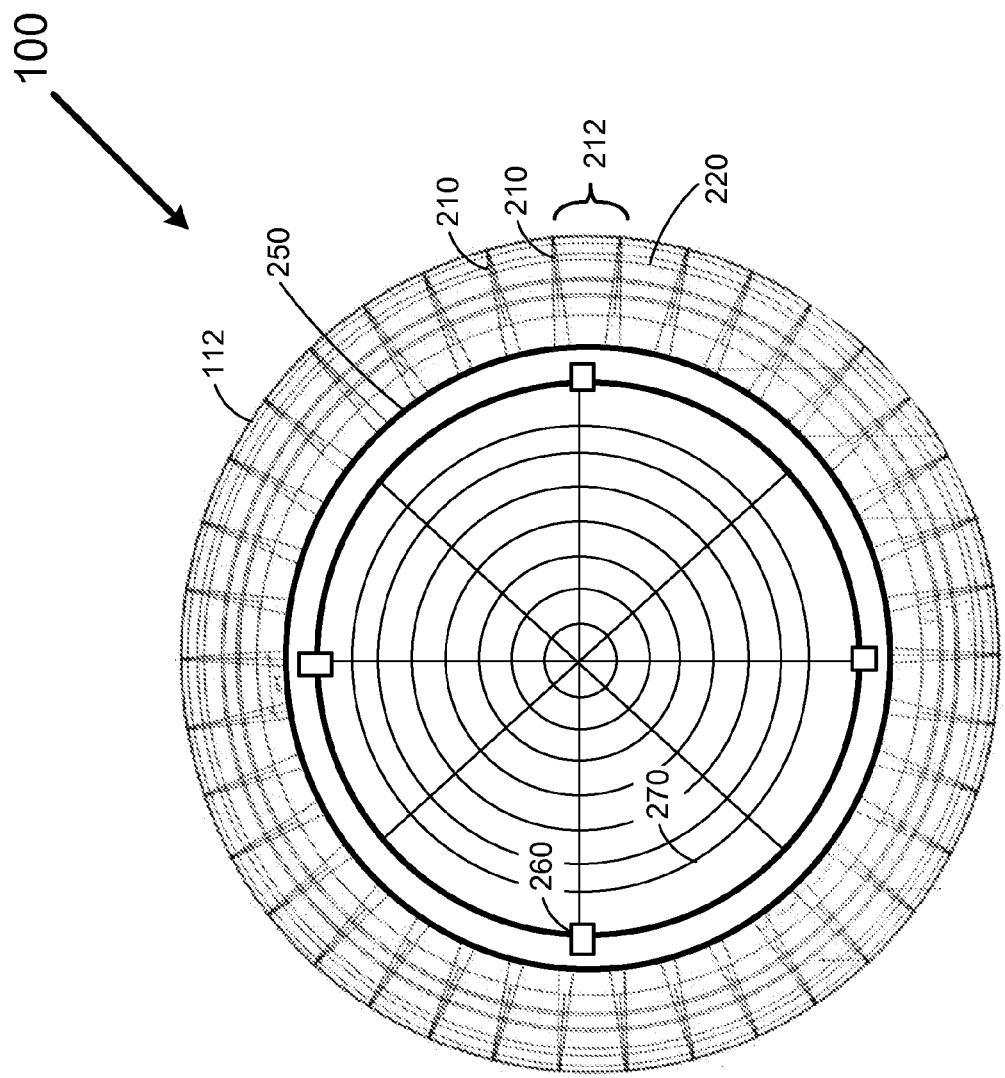
FIG. 2 is a plan view (cut-through) perspective of the energy tower of FIG. 1.

FIG. 2 is a top-down (cut-through) perspective of the energy tower 100 of FIG. 1. The energy tower 100 has a main cylindrical wall 250 whereby inside the cylindrical wall 250 downward wind drafts are generated by adding moisture to hot-dry air occurring at the top of the tower 100. Sensors 260 are located around the top perimeter of the energy tower 100, as well as along the inside walls throughout the height of the energy tower 100 (not shown). The sensors 260 may include any number of sensing devices and can be capable of measuring, for example, temperature, wind-speed, humidity, solar radiation, $CO_2$, and so on.

Moisture is added by a series of sprinklers 270 located at or near the top of the tower 100 with the sprinklers 270 arranges in a radial web-like structure. In various embodiments, moisture can be controllably added to air as a function of the atmospheric conditions at the top of the tower 100 as measured by the sensors 260. For example, the moisture provided by the sprinklers 270 may be increased with increased temperatures, or conversely the moisture provided by the sprinklers 270 may be decreased with increased temperatures depending on whether it is desirable to increase, decrease or maintain a particular wind speed at the bottom of the tower 100.

Figure 2B:
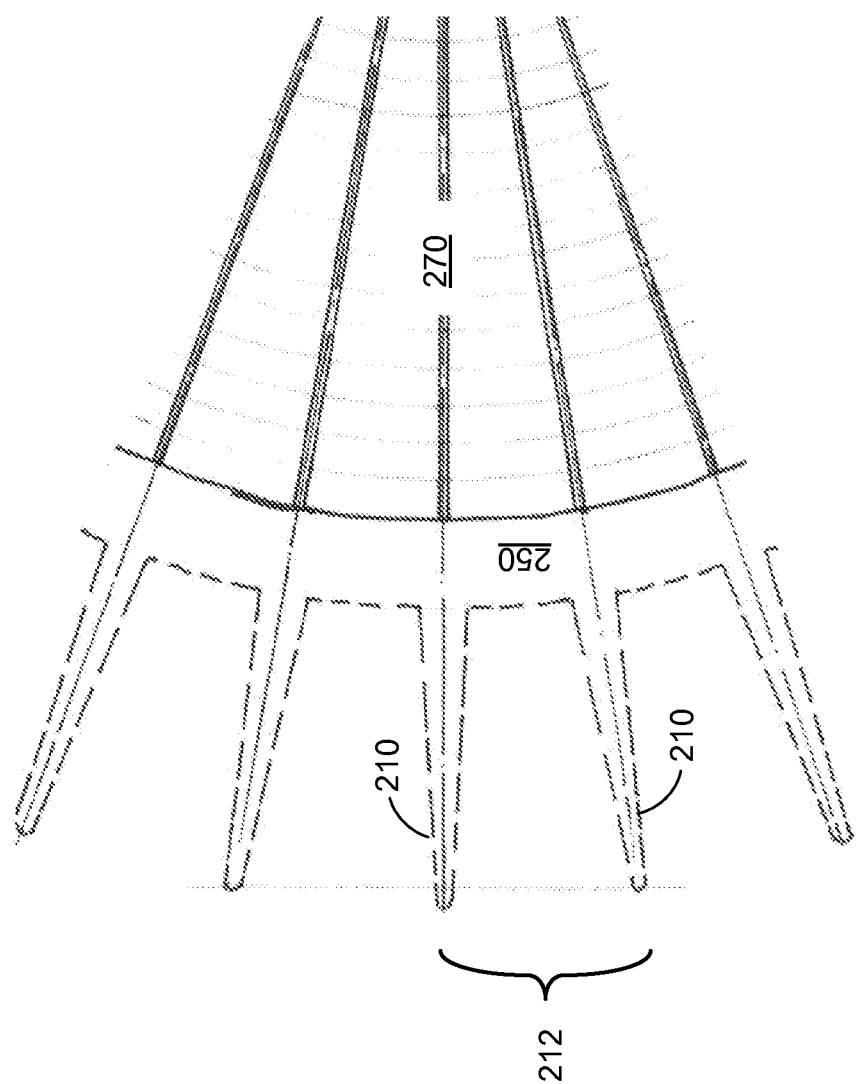
FIG. 2B depicts details of a section if the energy tower as shown in FIG. 2.

Outside the cylindrical wall 250 extend thirty-eight (38) vanes 210 that, with the cylindrical wall 250, define thirty-eight (38) vertically elongated air pockets 212 where incident wind may be captured and directed to one or more wind tunnels. Note that the tower 100 is cylindrically-shaped, and the vanes 210 extend in a radial fashion from the energy tower 100 and provide structural support to the energy tower 100. To help direct incident wind, flaps 220 are incorporated within each pocket 212. FIG. 2B depicts details of the tower energy wall 250, vanes 210, air pockets 212, and sprinkler system with sprinklers 270. To help accelerate wind in the air pockets 212, moisture may be added as be further explained below.

It is to be appreciated in light of the present specification that the vanes 210 have at least two functions: (1) to add structural integrity/support to the energy tower 100 as a buttress, and (2) to provide an additional form of energy generation by way of capturing wind energy. In this sense, the vanes provide two novel improvements over previously conceived/conventional energy towers.

For the purposes of this disclosure, wind developed within the energy tower 100 shall be referred to as "generated wind" while incident wind captured and channeled by the various air pockets 212 shall be referred to as "captured wind." Also, the term "incident wind" is used to denote naturally occurring wind making contact with the exterior of the energy tower 100.

Figure 3:
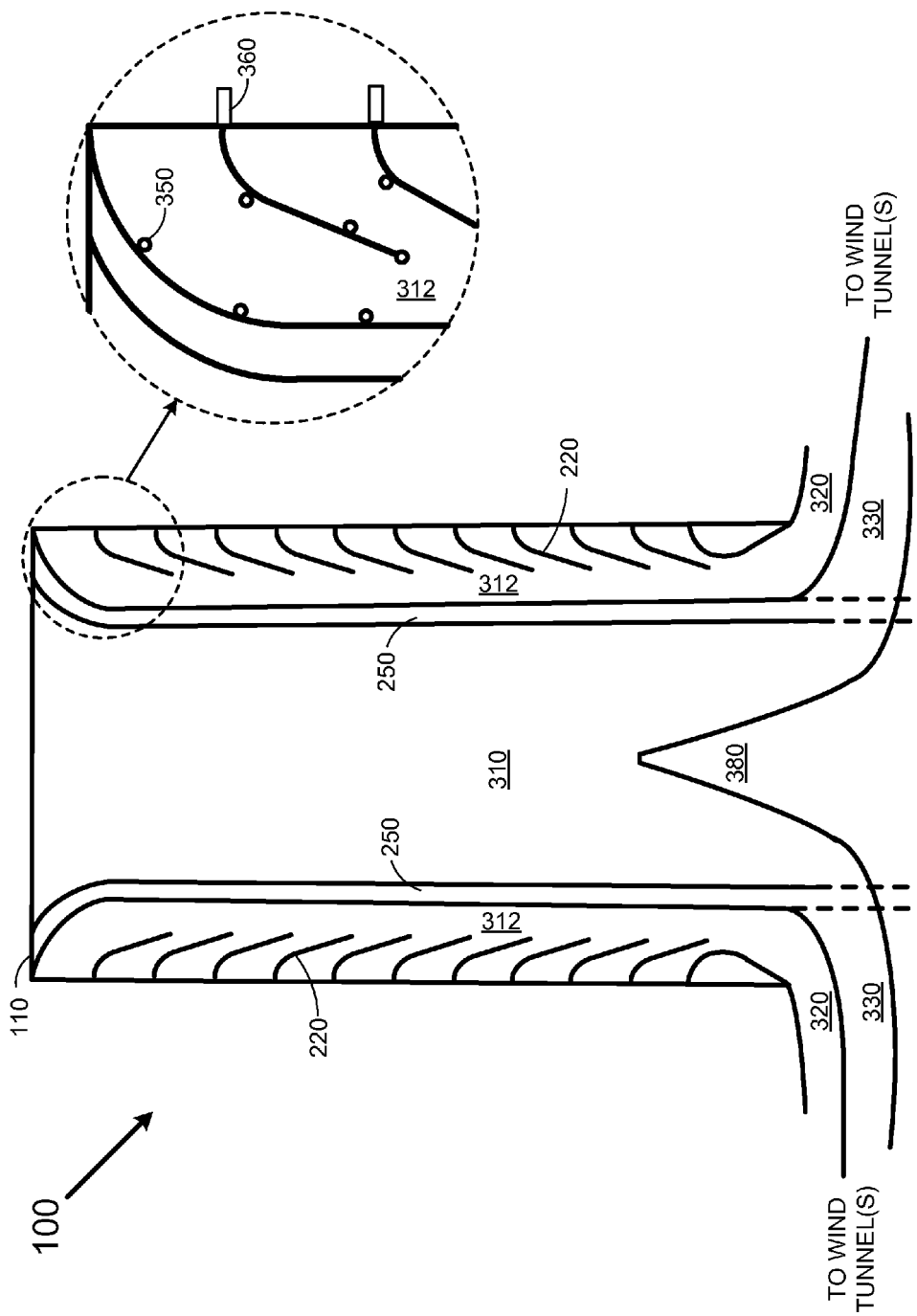
FIG. 3 is a side view (cut-through) perspective of the energy tower of FIG. 1.

FIG. 3 is a side view (cut-through) perspective of the energy tower 100 of FIG. 1 better displaying the wind-directing flaps 220 and channels 312 with each air pocket 212, as well as the interior 310 of the energy tower 100 and wind-directing channels 320 and 330, which are used to channel wind to wind-capturing turbines (not shown in FIG. 3) as will be further explained below. As shown in the upper-right-hand side of FIG. 3, sensors 360 are placed adjacent to the flaps 220, and water sprinklers 350 are added to the back side of the channel 312 and to the flaps 220. In various embodiment, the sprinklers may alternately be arranged as a web similar to the sprinkler system 270 shown in FIG. 2. The water sprinklers 350 are configured to controllably add moisture to the interior of each air pocket 212 such that captured wind may be controllably accelerated to the bottom of the air pocket 212. As with the interior wind-generated winds, the water sprinklers 350 may controllably add water as a function of atmospheric conditions as measured by the sensors 360, which may be configured to measure all of some of wind-speed, temperature, humidity, etc, as well as sensed conditions within channels 312 and 320 by other sensors (not shown).

In various embodiments, the base 380 of tower 100 may be shaped to help generated downdraft wind flow into wind-directing channels 330 with better efficiency.

Figure 4:
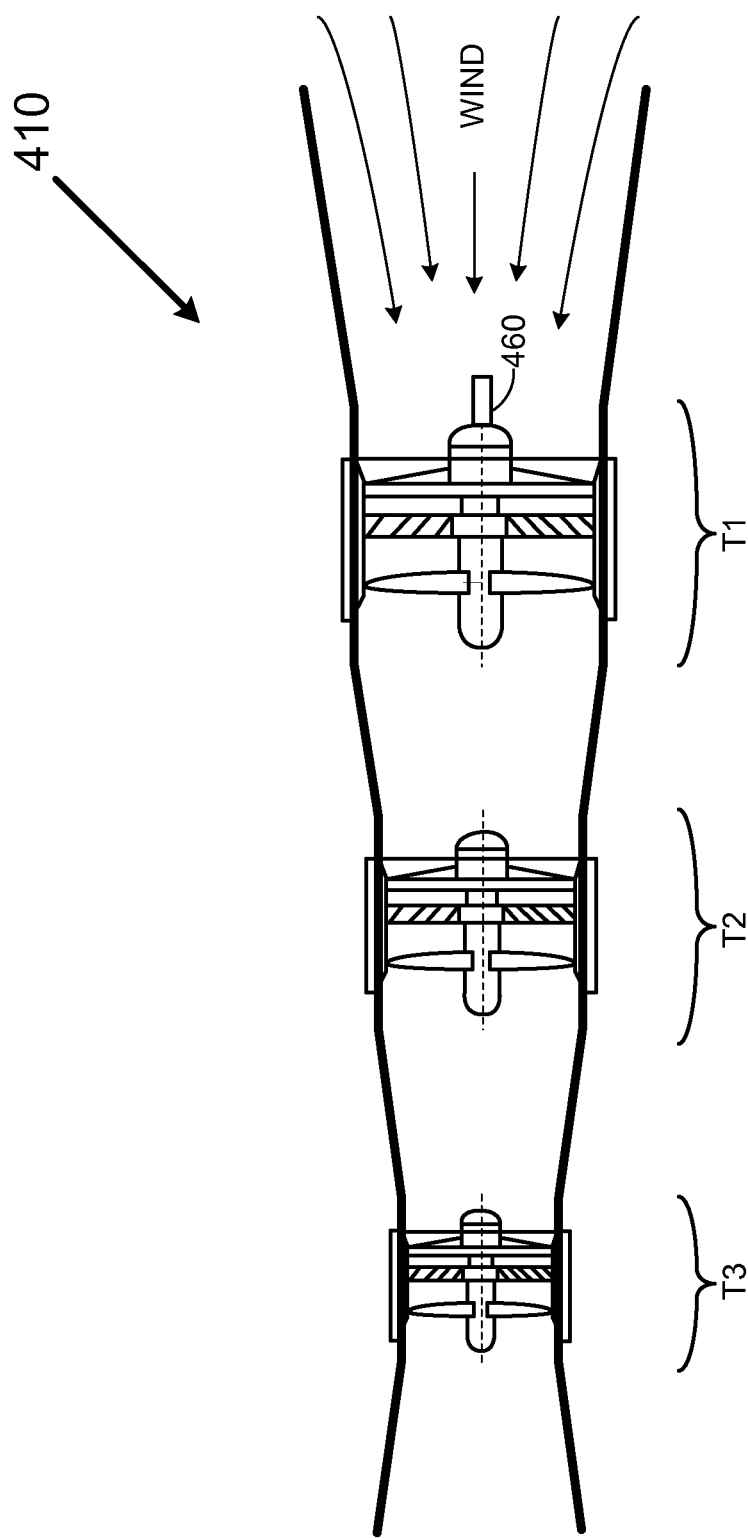
FIG. 4 is a wind-tunnel used with the energy tower of FIG. 1.

FIG. 4 is an energy-capturing wind-tunnel 410 used with the energy tower of FIG. 1. The wind tunnel 410 includes a plurality of wind turbines T1, T2 and T3 (with optionally one or more additional turbines possibly placed in line with turbines T1-T3). In operation, wind may flow from left-to-right through turbines T1 through T3 with each turbine T1-T3 extracting some measure of energy from the air with energy availability being proportional to the cube of wind speed at each turbine T1-T3. Assuming that approximately 50% of energy may be extracted by each turbine, it may be advantageous to make the wind-swept area of the blades of turbine T2 half that of turbine T1, and to make the wind-swept area of the blades of turbine T3 half that of turbine T2, and so on. Should energy extraction vary from 50%, the ratios of the wind-swept area of the blades of the various turbines may change accordingly. In the example of FIG. 4, the various turbines T1-T3 may each include fixed displacement or variable displacement hydraulic pump capable of pumping fluid from a low-pressure line (LPL) to a high-pressure line (HPL). While the various turbines are coupled to the same LPL and HPL, in various embodiments the various turbines T1-T3 may be designed to have independent hydraulic systems (with separate generator arrays) or hydraulic systems that are capable of being coupled/decoupled under control of a controller or some other decision maker.

Sensors 460 are added to facilitate control of the moisture adding process as discussed above. In various embodiments, one of the turbines T1, T2 or T3 may be used as a sensor for measuring air speed.

Figure 5:
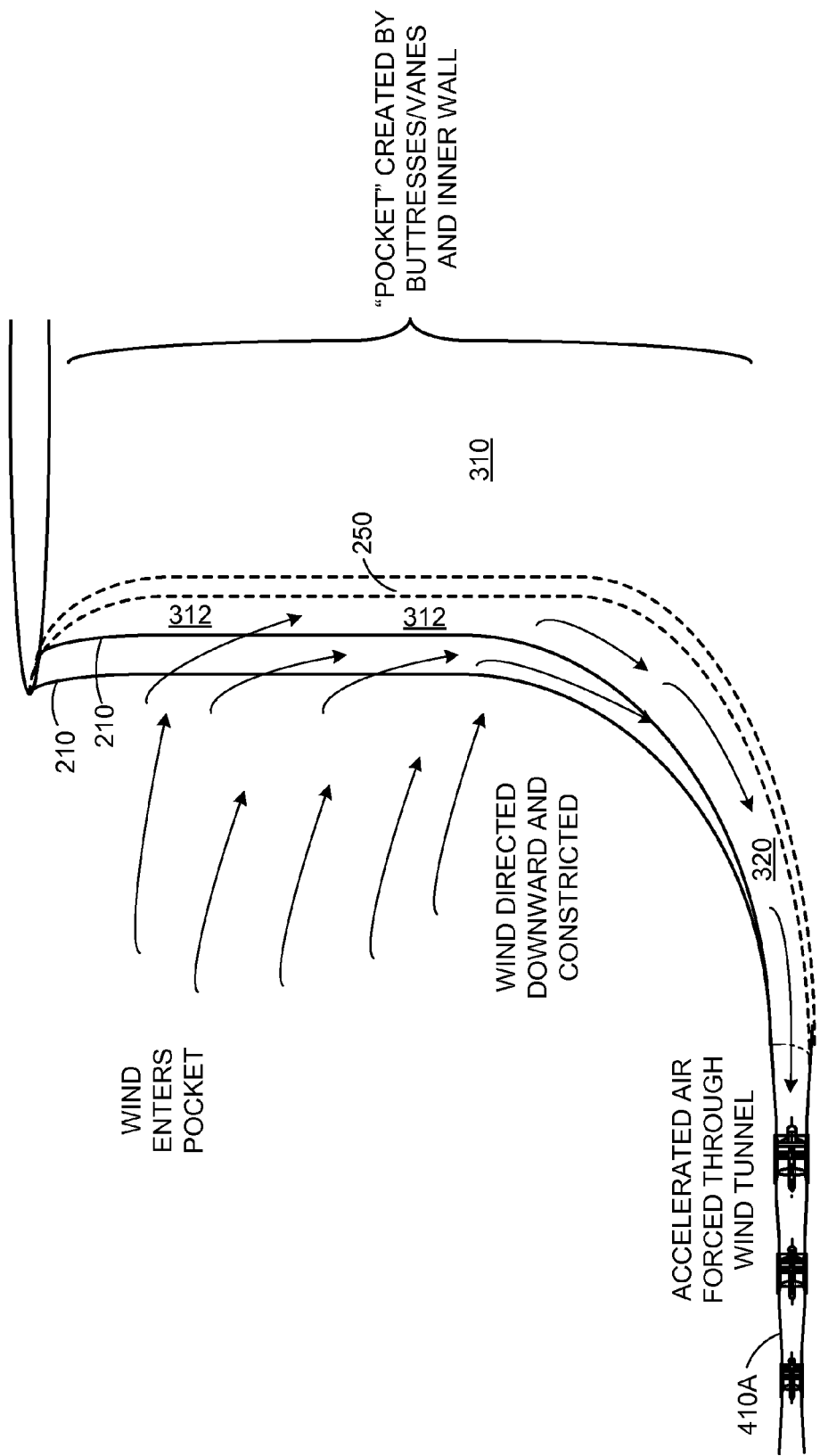
FIG. 5 depicts the exterior wind-capture structures of the energy tower of FIG. 1.

FIG. 5 depicts the exterior wind-capture structures of the energy tower 100 of FIG. 1. It may be appreciated that the outside of the exemplary energy tower 100 is modified in a novel manner to capture and redirect incident wind downward by virtue of the vanes 210 and flaps 220 (not shown on FIG. 5 for clarity) to a set of wind tunnels 410A while at the same time improved structural integrity may be had much in the way buttresses or flying buttresses were made to improve structural integrity of older structures. As shown in FIG. 5, two vanes/buttresses 210 are shown extending from wall 250. The resultant wind pocket/sail defined by the wall 250 and vanes/buttresses 210 receive incident wind and direct it downward where the redirected wind is constricted and accelerated (again—the Venturi effect) into channel 320 and fed into wind tunnel 410A. As discussed above, moisture may (optionally) be added in channels 312—either in a fixed or in a controllable fashion depending on incident wind conditions, in order to control wind speed as the captured and accelerated air enters channels 320.

Figure 6:
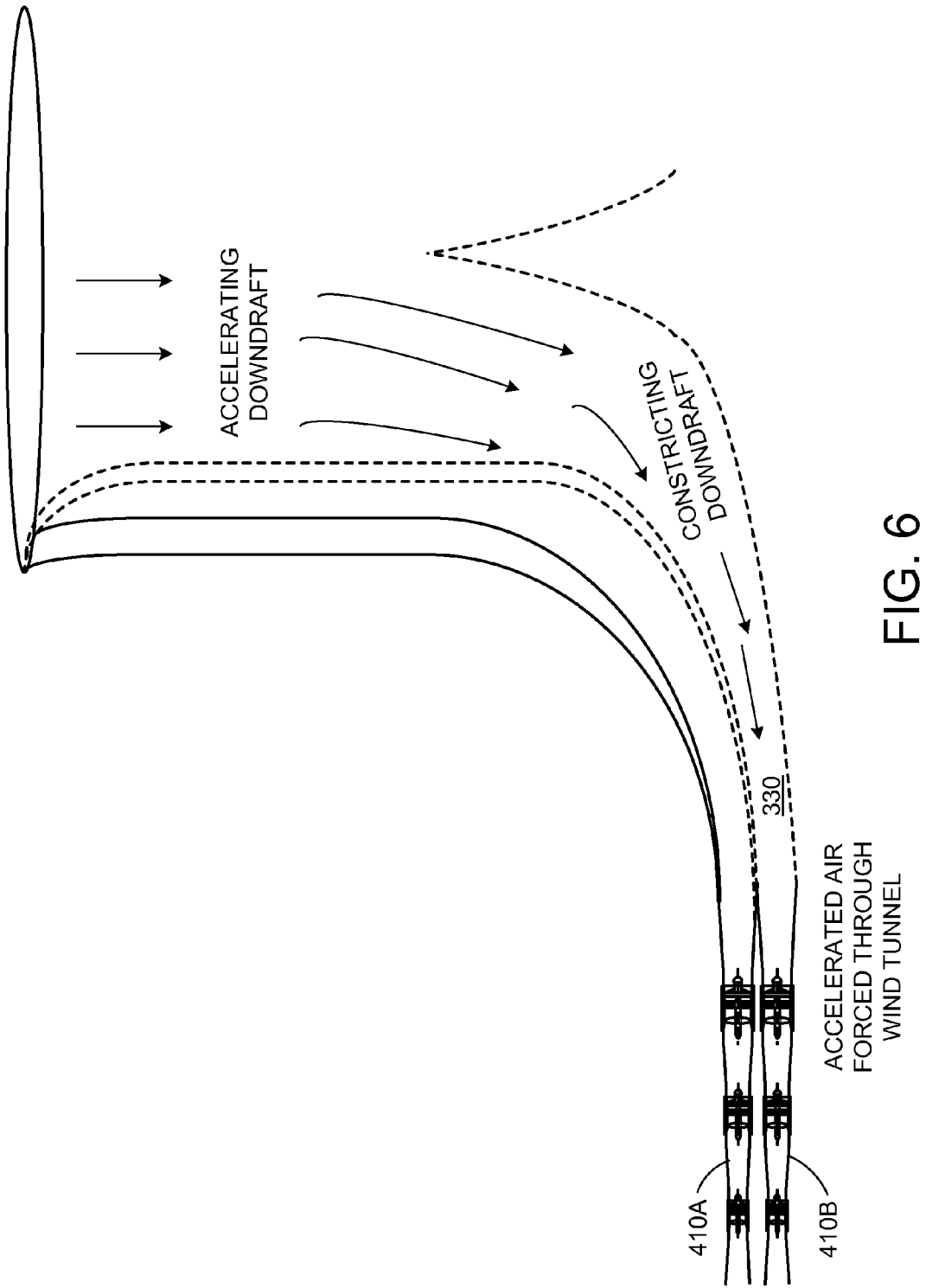
FIG. 6 depicts the interior atmospheric wind-generation of the energy tower of FIG. 1.

FIG. 6 depicts the interior atmospheric wind-generation of the energy tower of FIG. 1. As discussed above, moisture is controllably combined with hot-dry air at the top of the energy tower 100 to generate accelerating downdraft winds, which are constricted into channel 330 and fed into wind tunnel 410B.

Figure 7:
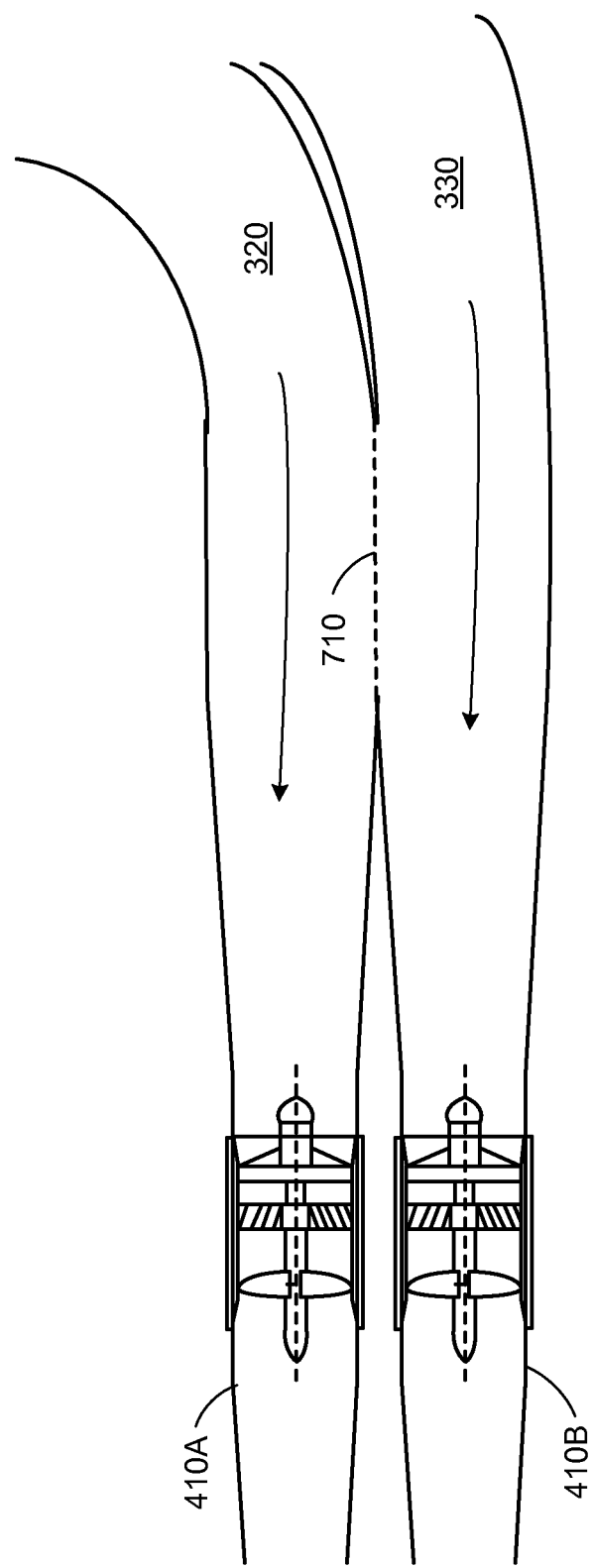
FIG. 7 depicts a first configuration for converting energy using multiple wind tunnels with a shunt in a first position.

FIG. 7 depicts a first wind-tunnel configuration for converting energy using multiple wind tunnels 410A and 410B with a shunt 710 in a first position. In the configuration of FIG. 7, the two channels 320 and 330 are isolated and the wind tunnels (and turbines therein) operate independently. Accordingly, incident wind captured by the exterior of the energy tower 100 is converted to electricity using the turbines of wind tunnel 410A while the downdraft wind created within the energy tower 100 is converted to electricity using the turbines of wind tunnel 410B.

Figure 8:
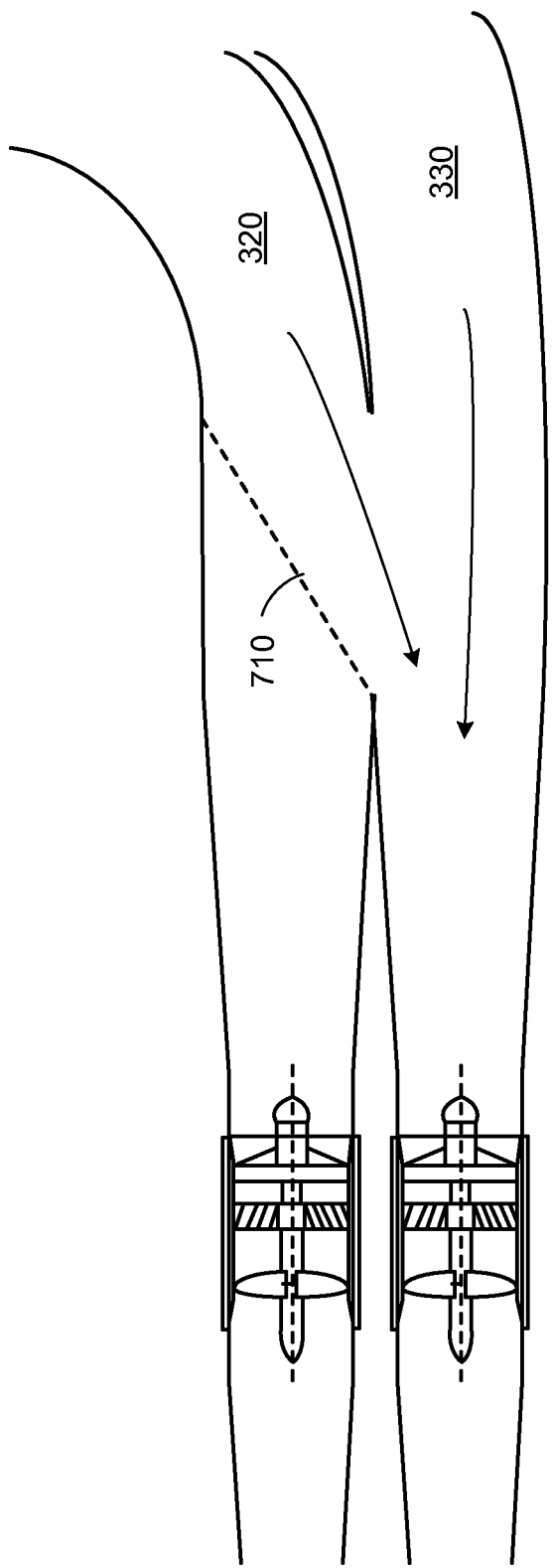
FIG. 8 depicts a second configuration for converting energy using multiple wind tunnels with a shunt in a second position.

Because wind-capturing turbines may be designed to operate at certain ranges of wind speed, it is to be appreciated by those skilled in the art in light of the present disclosure that there may be times, e.g., night time, where downdraft wind fed to wind tunnel 410B falls below a desired range, and incident wind captured by the external walls to the energy tower 100 and fed to wind tunnel 410A is also light. Rather than have the two separate wind tunnels 410A and 410B operate inefficiently, the shunt 710 may be reconfigured according to FIG. 8 such that the volume of wind from both channels 320 and 330 are combined and fed to a single wind tunnel 410B.

In various embodiments, this concept may be expanded beyond sharing or isolating captured wind energy between interior and exterior captured wind. For example, in some embodiments, there may be four or more wind tunnels having shunts to allow exterior captured wind and interior generated wind to be directed to any combination of wind tunnels. Also, there may be times when it is advantageous to feed externally captured wind to three wind tunnels, while directing internally generated wind to a single tunnel, while at different times it may be advantageous to reconfigure shunts to provide four wind tunnels for internally generated wind while allowing no wind tunnel for externally captured wind.

Additionally, in certain embodiments, captured wind from a particular external wind pocket/sail 212 (not shown in FIG. 6) may be released into a turbine reserved for another wind pocket/sail 212 through lateral shunts (also not shown).

In various embodiments, the addition of the various shunts can enable repair crews to service one wind tunnel while still enabling electricity to be generated by virtue of both externally captured wind and internally generated wind.

FIG. 9 is a flowchart outlining an exemplary operation for efficiently converting mechanically captured wind energy into electricity.

The process starts in step 910 where the available wind energy captured by an energy tower using the exterior wind pockets 212 discussed above are directly measured, indirectly measured or calculated based on various sensor readings. Next, in step 912, moisture may be controllably added to the captured wind to further accelerate the captured wind so as to optimize wind speed at the base of the wind pockets 212, which can be used to generate electric power using wind turbines and electric generators. Then, in step 914, the wind speed and/or energy of the captured and (optionally) accelerated wind may be measured or calculated. It is to be appreciated that step 912 may take into account data provided by one or both of steps 910 and 914. Control continues to step 920.

In step 920, the atmospheric conditions (e.g., temperature, wind speed, humidity . . . ) at the top of the energy tower are directly or indirectly measured. Next, in step 922, moisture may be controllably added to the air at the top of the energy tower to produce interior generated wind, which can be captured by turbines and generators at the base of the energy tower. Then, in step 924, the wind speed and/or energy of the captured and (optionally) accelerated wind may be measured or calculated. It is to be appreciated that step 922 may take into account data provided by one or both of steps 920 and 924. Control continues to step 930.

In step 930, various shunts are configured such that the captured wind from the exterior of the energy tower and the generated wind of the interior of the tower can be apportioned advantageously so as to keep turbines operating within an optimal or otherwise advantageous range. In various embodiments, one or more shunts are used to combine generated wind and captured wind to a single wind tunnel so as to enable the single wind tunnel to simultaneously convert the combined wind energy into electricity. In another series of embodiments, one or more shunts are used to separate generated wind into two or more wind tunnels such that each of the two or more wind tunnels simultaneously convert the generated wind energy into electricity. In another series of embodiments, one or more shunts are used to separate captured wind into two or more wind tunnels such that each of the two or more wind tunnels simultaneously convert the captured wind energy into electricity.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. An apparatus for producing electricity, comprising:
a tower having first sprinklers capable of adding moisture at a top of the tower to hot-dry air so as to generate a downdraft of wind within an interior of the tower so as to create generated wind at a bottom of the tower;
vanes coupled to an exterior of the tower that at least partially define elongated pockets at the exterior of the tower, and flaps located within the pockets configured to redirect incident wind downwards to create captured wind at the bottom of the tower; and
at least a first wind tunnel configured to receive at least one of the generated wind or the captured wind, and convert at least one of the generated wind and the captured wind into electricity.

2. The apparatus of claim 1, wherein the tower is cylindrically-shaped, and the vanes extend in a radial fashion from the tower and provide structural support to the tower.

3. The apparatus of claim 1, further comprising one or more first sensors capable of measuring atmospheric conditions, wherein the moisture added by the first sprinklers is controlled based on air measurements made by the one or more first sensors.

4. The apparatus of claim 3, further comprising one or more second sensors within the energy tower, wherein the moisture added by the first sprinklers is controlled based on air measurements made by the one or more second sensors.

5. The apparatus of claim 1, further comprising second sprinklers within the pockets capable of adding moisture to air within the pockets.

6. The apparatus of claim 5, further comprising one or more third sensors capable of measuring atmospheric conditions, wherein the moisture added by the second sprinklers is controlled based on air measurements made by the one or more third sensors.

7. The apparatus of claim 6, further comprising one or more forth sensors within the pockets, wherein the moisture added by the second sprinklers is controlled based on air measurements made by the one or more forth sensors.

8. The apparatus of claim 6, wherein the second sprinklers controllably add moisture to air within the elongated pockets so based on at least one of measured wind speed or calculated wind speed.

9. The apparatus of claim 6, further comprising at least a second wind tunnel, wherein the first wind tunnel is configured to receive the generated wind of the interior of the tower so as to convert the generated wind to electricity, and wherein the second wind tunnel is configured to receive the captured wind of the exterior of the tower so as to convert the captured wind to electricity.

10. The apparatus of claim 9, further comprising one or more first shunts enabling at least one of the first wind tunnel and the second wind tunnel to simultaneously receive both the externally captured wind and internally generated wind, and convert such combined wind energy into electricity.

11. A method for producing electricity, comprising:
adding moisture at a top of an energy tower to hot-dry air so as to generate a downdraft of wind within an interior of the energy tower so as to create generated wind at a bottom of the energy tower;
capturing incident wind using vanes coupled to an exterior of the tower that at least partially define elongated pockets at the exterior of the tower, and flaps located within the pockets configured to redirect incident wind downwards to create captured wind at the bottom of the tower; and
converting at least one of the generated wind or the captured wind to electricity using a first wind tunnel.

12. The method of claim 11, wherein converting at least one of the generated wind or the captured wind to electricity includes using a first wind tunnel to convert the generated wind into electricity using the first wind tunnel and using a second wind tunnel to convert captured wind into electricity.

13. The method of claim 11, wherein the tower is cylindrically-shaped, and the vanes extend in a radial fashion from the tower and provide structural support to the tower.

14. The method of claim 11, further comprising adding moisture to air within the elongated pockets so as to accelerate the captured wind.

15. The method of claim 11, further comprising controllably adding moisture to air within the elongated pockets so as to controllably accelerate the captured wind.

16. The method of claim 15, further comprising measuring wind speed entering the elongated pocket, and controllably adding moisture to air within the elongated pockets based on at least the measured wind speed.

17. The method of claim 16, further comprising measuring or calculating wind speed exiting the elongated pocket, and controllably adding moisture to air within the elongated pockets based on at least the measured/calculated wind speed.

18. The method of claim 11, further comprising sensing at least one or more first atmospheric conditions at or near the top of the tower, and controllably adding moisture to air within the tower based on the one or more first atmospheric conditions.

19. The method of claim 18, further comprising sensing at least one or more second atmospheric conditions within the tower, and controllably adding moisture to air within the tower based on the one or more second atmospheric conditions.

20. The method of claim 19, wherein the one or more second atmospheric conditions includes wind-speed within at least one wind tunnel.

* * * * *